United States Patent
Klein et al.

(10) Patent No.: US 10,323,623 B2
(45) Date of Patent: Jun. 18, 2019

(54) SYSTEM AND METHOD FOR TRANSPORTING OR STORING WIND TURBINE TOWER SECTIONS

(71) Applicant: General Electric Company, Schenectady, NY (US)

(72) Inventors: Douglas C. Klein, Greenville, SC (US); Joseph Liles, Conroe, TX (US); Peter Stuart, Conroe, TX (US)

(73) Assignee: General Electric Company, Schenectady, NY (US)

( * ) Notice: Subject to any disclaimer, the term of this patent is extended or adjusted under 35 U.S.C. 154(b) by 13 days.

(21) Appl. No.: 15/333,242

(22) Filed: Oct. 25, 2016

(65) Prior Publication Data
US 2018/0111750 A1 Apr. 26, 2018

(51) Int. Cl.
*F03D 13/40* (2016.01)
*B65D 85/68* (2006.01)
(Continued)

(52) U.S. Cl.
CPC ............... *F03D 13/40* (2016.05); *B60P 7/12* (2013.01); *B65D 85/68* (2013.01); *B66C 1/00* (2013.01);
(Continued)

(58) Field of Classification Search
CPC ... B60P 7/12; B60P 3/40; F03D 13/40; B65D 85/68; B65D 2519/00815;
(Continued)

(56) References Cited

U.S. PATENT DOCUMENTS 5,755,541 A * 5/1998 Suarez ..................... B60P 7/12
410/36
7,210,882 B2 5/2007 Andersen et al.
(Continued)

FOREIGN PATENT DOCUMENTS

CN 201914610 U 8/2011
CN 102765545 A 11/2012
(Continued)

OTHER PUBLICATIONS

Prior Art Frame 1 Photographs.
(Continued)

*Primary Examiner* — Stephen T Gordon
(74) *Attorney, Agent, or Firm* — Dority & Manning, P.A.

(57) ABSTRACT

The present disclosure is directed to a system for transporting or storing one or more tower sections of a tower of a wind turbine. The system includes at least one pair of cradle elements having a first cradle element configured to support a lower portion of the tower section and a second cradle element configured to support an upper portion of the tower section. The first and second cradle elements are securable to a flange of one of the tower sections and are also reversible in that a first side of the first and second cradle elements is configured to accommodate a tower section having a first diameter and an opposite, second side of the first and second cradle elements is configured to accommodate a tower section having a different, second diameter. The system also includes a pair of support members coupled to each of the first and second cradle elements.

12 Claims, 15 Drawing Sheets

(51) Int. Cl.
*F16M 11/00* (2006.01)
*B60P 7/12* (2006.01)
*B66C 1/00* (2006.01)
*B66C 1/10* (2006.01)

(52) U.S. Cl.
CPC ............ *B66C 1/108* (2013.01); *F16M 11/00* (2013.01); *B65D 2519/00815* (2013.01); *B65D 2585/6897* (2013.01)

(58) Field of Classification Search
CPC ... B65D 2585/6897; B66C 1/00; B66C 1/108; F16M 11/00
USPC .......... 410/36, 44–45, 47, 49, 53, 120, 155; 206/391, 443, 446; 211/85.18, 59.4; 248/68.1
See application file for complete search history.

(56) References Cited

U.S. PATENT DOCUMENTS

| | | | |
|---|---|---|---|
| 7,775,753 | B2 | 8/2010 | Pedersen |
| 7,878,742 | B2 | 2/2011 | Wobben |
| 8,118,523 | B2 | 2/2012 | Pedersen |
| 8,136,329 | B2 | 3/2012 | Willis |
| 8,506,218 | B2 | 8/2013 | Delgado Matarranz et al. |
| 8,529,174 | B1 | 9/2013 | Landrum et al. |
| 8,657,323 | B2 | 2/2014 | Pedersen |
| 8,668,415 | B2 | 3/2014 | Yogodzinski |
| 8,690,140 | B2 | 4/2014 | Rasmussen et al. |
| 8,998,546 | B2 | 4/2015 | Fenger |
| 2008/0003088 | A1 | 1/2008 | Banta |
| 2013/0236263 | A1* | 9/2013 | Peterson ................. B60P 3/40 410/44 |
| 2015/0003954 | A1 | 1/2015 | Koerner et al. |
| 2015/0252943 | A1 | 9/2015 | DiGiovine |

FOREIGN PATENT DOCUMENTS

| | | |
|---|---|---|
| CN | 202625655 U | 12/2012 |
| CN | 202687062 U | 1/2013 |
| CN | 103644083 A | 3/2014 |
| CN | 103717888 A | 4/2014 |
| CN | 104085603 A | 10/2014 |
| CN | 204003279 U | 12/2014 |
| CN | 204021518 U | 12/2014 |
| CN | 104875670 A | 9/2015 |
| CN | 105620673 A | 6/2016 |
| EP | 2626547 A1 | 8/2013 |
| EP | 2591233 B1 | 9/2014 |
| KR | 101487311 B1 | 1/2015 |
| WO | WO2011134472 A1 | 11/2011 |
| WO | WO201515835 A1 | 10/2015 |
| WO | WO2015158350 A1 | 10/2015 |

OTHER PUBLICATIONS

Prior Art Frame 2 Photograph.
Prior Art Frame 3 Photographs.
Prior Art Frame 4 Photographs.

* cited by examiner

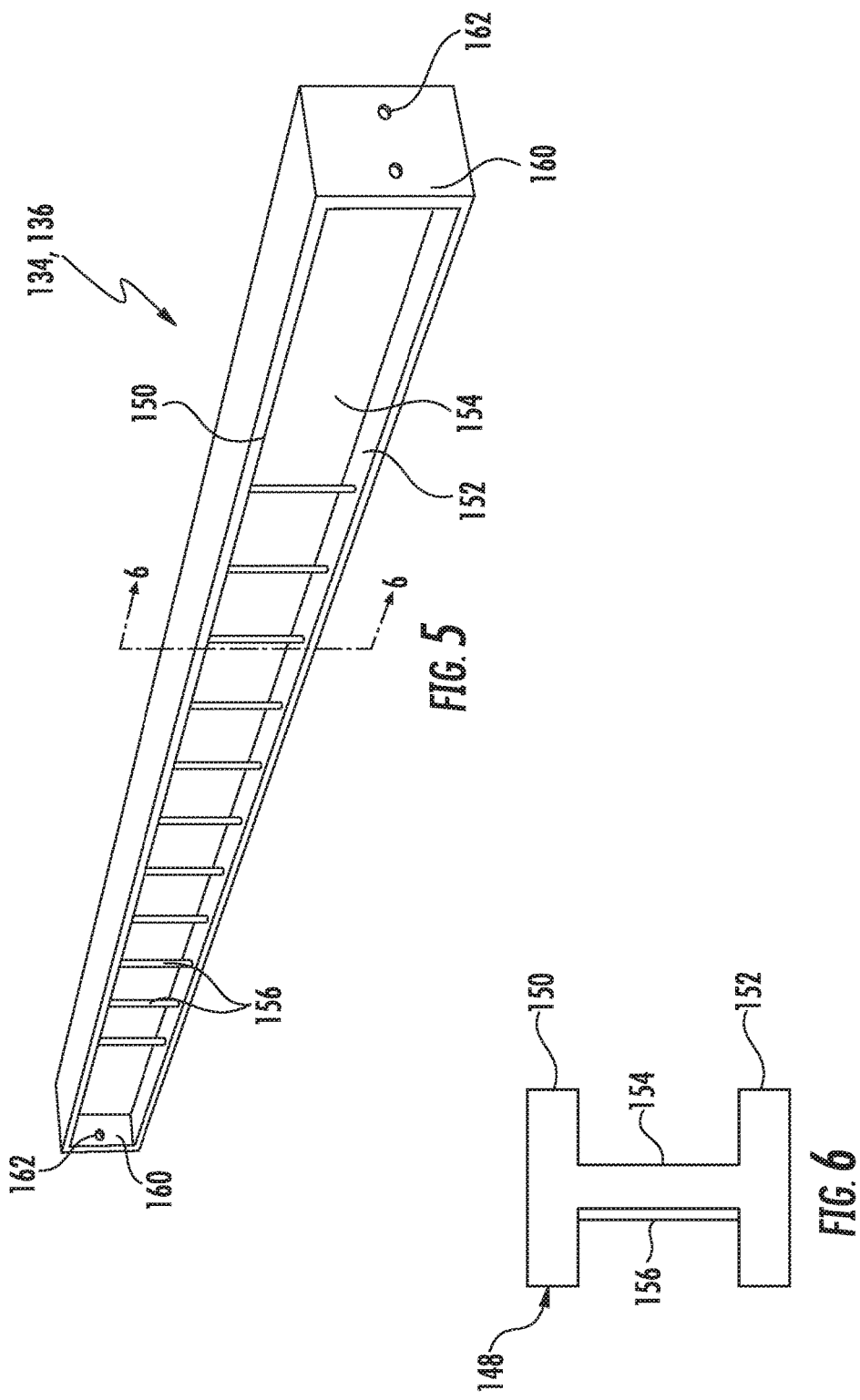

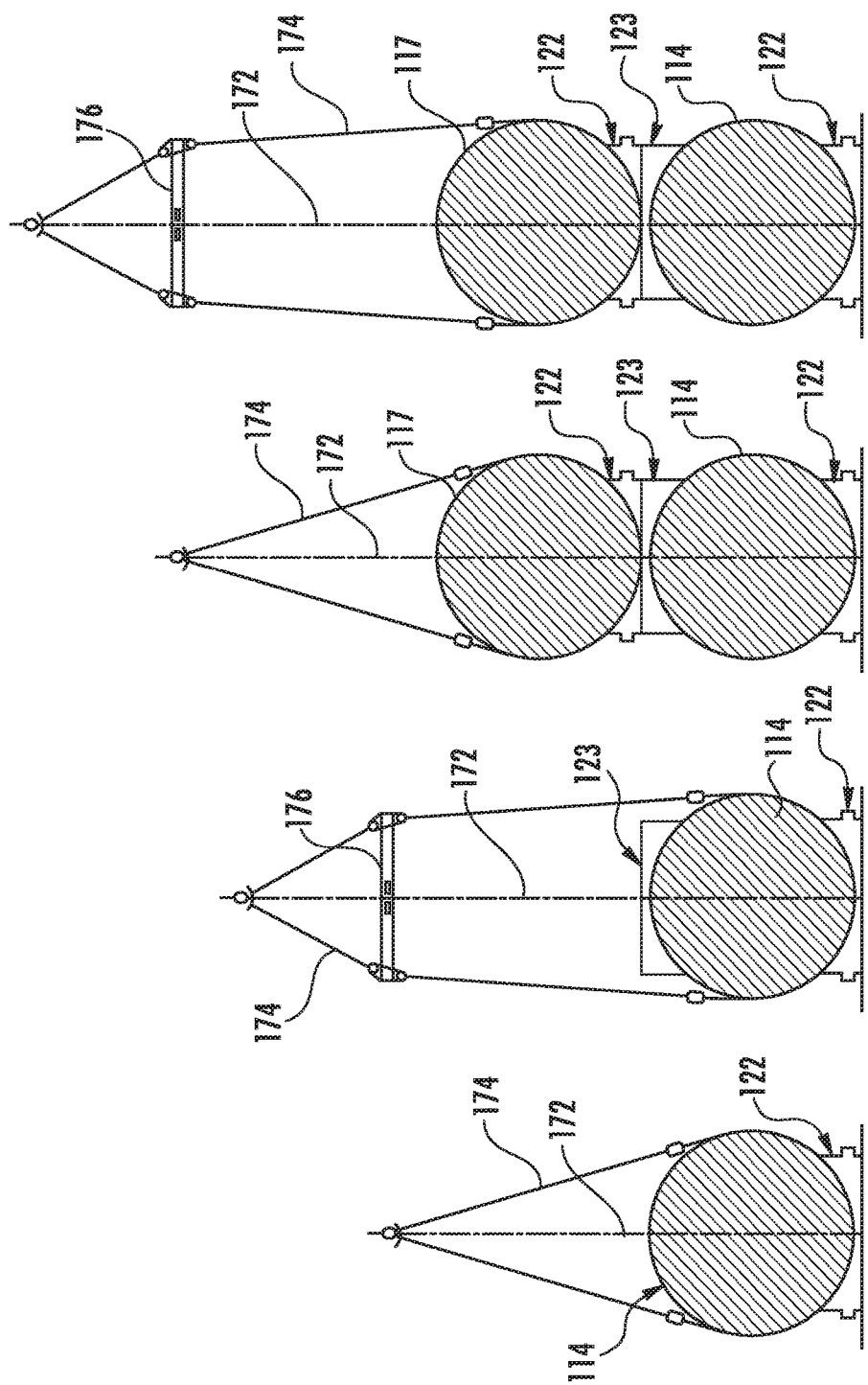

SYSTEM AND METHOD FOR TRANSPORTING OR STORING WIND TURBINE TOWER SECTIONS

FIELD OF THE INVENTION

The present disclosure relates generally to wind turbines, and more particularly to systems and methods for transporting and/or tower sections of wind turbines.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

The wind turbine tower is typically constructed of multiple tower sections that are stacked and secured together. Further, it is common for wind turbine components such as the tower sections to be transported, e.g. on shipping vessels, to their desired destinations and/or stored. Certain cargo shipping vessels have weather decks that are equipped with accessible locking mechanisms such as conventionally known semi-automatic twist-lock mechanisms for releasably securing conventional cargo containers (e.g., rectangular, box-shapes cargo containers) thereto. The cargo containers have corresponding locking mechanisms at their bottom corners for mating with the locking mechanisms on the deck, and at their top corners to lock together stacked cargo containers. The ship's locking mechanisms are thus spaced across the width of the deck and located intermittently longitudinally of the deck.

For shipping purposes, wind turbine tower sections—which are typically cylindrical or frusto-conical—are fitted at both ends with a support member having a bottom that defines a pair of spaced apart feet or a straight, flat surface for stably resting the tower section on the ship's deck and for preventing the tower section from rolling. Additional locking mechanisms may be located at the top of the support member to permit stacking (in side-by-side relationship) of tower sections in the same manner as a cargo container.

Existing shipping or storage fixtures for wind tower sections, however, accommodate limited tower types and sizes. As such, introduction of new tower designs require lengthy engineering analysis, redesign of shipping fixtures, and/or large scale investment in new fixtures.

Additionally, some shipping vessels that are used to transport wind turbine tower sections have decks or floors with a maximum pressure rating. As larger wind turbine tower sections are being used and transported, the weight of the sections that are transported is increasing and the pressure they exert on various shipping floors is increasing. While it would be desirable to increase the number of tower sections that can be loaded within a single shipping vessel, it is also important to heed the load limits thereof.

Therefore, there is a need for a system and method for transporting and/or storing tower sections of wind turbines that enables stacking of the tower sections and accommodates a wide range of tower section bolt patterns, diameters, and/or loads.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a system for transporting or storing one or more tower sections of a tower of a wind turbine. The system includes at least one pair of cradle elements having a first cradle element configured to support a lower portion of the tower section and a second cradle element configured to support an upper portion of the tower section. The first and second cradle elements are securable to a flange of one of the tower sections and are also reversible in that a first side of the first and second cradle elements is configured to accommodate a tower section having a first diameter and an opposite, second side of the first and second cradle elements is configured to accommodate a tower section having a different, second diameter. The system also includes a pair of support members coupled to each of the first and second cradle elements, e.g. so as to maintain the first and second cradle elements in the proper location with respect to each other.

More specifically, in one embodiment, the first and second cradle elements may each include one or more bolt slot openings. In such embodiments, the first and second cradle elements are securable to the flange of one of the tower sections via one or more flange bolts being secured through the one or more bolt slot openings.

In another embodiment, the first and second cradle elements may each include an upper surface having one or more lifting components, e.g. fork lift pockets and/or lift points. Further, in certain embodiments, the upper surface of the first cradle element and a lower surface of the second cradle element may each include a pair of recesses configured to receive the pair of support members. In addition, for particular embodiments, the upper surface of the second cradle element may be a flat continuous upper surface configured for receiving a first cradle element of an adjacent tower section stacked thereon.

In further embodiments, each of the support members may have an I-shaped or H-shaped cross-section comprising parallel flanges separated by a web. In such embodiments, each of support members may include one or more rod members welded between the parallel flanges adjacent to the web on one or more sides thereof. As such, the rod members provide a ladder configuration for personnel.

In additional embodiments, the system may further include at least one shim plate configured to fit within each of the recesses of the first and/or second cradle members. In such embodiments, each of support members may also include opposing end caps having one or more bolt hole locations configured to receive shim bolts that secure the shim plates thereto.

In yet another embodiment, the first cradle element and/or the second cradle element may include one or more trunnions configured on opposing sides thereof. As such, the trunnion(s) may be configured as the primary lifting components of the system when stacking and/or arranging the tower sections for transportation or storage.

In still further embodiments, the first and second cradle elements may also include one or more attachment locations configured to receive at least one of a chain or strap for securing the first and second cradle elements to a foundation. For example, in one embodiment, the attachment location(s) may include one or more b-rings.

In additional embodiments, the system may include a plurality of pairs of cradle elements and a plurality of pairs of support members configured to fit a plurality of tower sections having varying diameters. As such, a plurality of tower sections can be arranged and/or stacked together and easily transported or stored.

In another aspect, the present disclosure is directed to a system for transporting or storing one or more tower sections of a tower of a wind turbine. The system includes at least one cradle element configured to support a lower portion of the tower section. The cradle element is securable to a flange of one of the tower sections and is reversible in that the cradle element includes a first side having a first arrangement of bolt holes that correspond to bolt locations of the flange of a tower section having a first diameter and an opposite, second side having a second arrangement of bolt holes that correspond to bolt locations of the flange of a tower section having a different, second diameter. It should be understood that the system may further include any of the additional features as described herein.

In yet another aspect, the present disclosure is directed to a method of transporting or storing tower sections of a tower of a wind turbine. The method includes arranging a first tower section in a horizontal position. The method also includes selecting a pair of cradle elements for securing to a flange of the first tower section based on a diameter of the flange. Further, the pair of cradle elements includes a first cradle element and a second cradle element. As such, the method also includes securing the first cradle element to a lower portion of the flange of the first tower section. Moreover, the method includes installing first ends of a pair of support members into a first pair of recesses in the first cradle element. In addition, the method includes installing second ends of the pair of support members into a second pair of recesses in the second cradle element. The method also includes securing the second cradle element to an upper portion of the flange of the first tower section. It should be understood that the method may further include any of the additional steps and/or features as described herein.

In one embodiment, the method may also include securing at least one of the first or second cradle elements at the flange to a foundation. Further, the method may also include identifying a center line of the flange of the first tower section and locating a center of the first and second cradle elements for the flange at the center line.

In another embodiment, the method may include selecting which side of the first and second cradle elements to secure to the lower and upper portions of the flange of the first tower section, respectively, based on a diameter of the tower section. For example, in certain embodiments, a first side of the first and second cradle elements is configured to accommodate a tower section having a first diameter and an opposite, second side of the first and second cradle elements is configured to accommodate a tower section having a different, second diameter.

In further embodiments, the steps of securing the first and second cradle elements to the lower and upper portions of the flange of the first tower section, respectively, may include while the first tower section is held in place, aligning one or more bolt slot openings of the first and second cradle elements with bolt locations of the flange of the first tower section, inserting a plurality of bolts through the one or more bolt slot openings, and mounting the first and second cradle elements to the lower and upper portions of the flange of the first tower section, respectively, via the bolts.

In additional embodiments, the method may include inserting at least one of a support pad or a shim plate into at least one of the first or second pairs of recesses of the first and second cradle elements before inserting the pair of support members.

In still another embodiment, the method may include securing additional first cradle elements to a lower portion of a flange of a second tower section and stacking the second tower section atop the first tower section.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 5 illustrates a perspective view of one embodiment of a support member of the system for transporting and/or storing tower sections of wind turbines of the present disclosure;

FIG. 6 illustrates a cross-sectional view of the support member of FIG. 5 along line 6-6;

FIG. 7A illustrates a cross-sectional view of one embodiment of a lifting arrangement for a tower section configured with the system for transporting and/or storing tower sections of wind turbines of the present disclosure;

FIG. 7B illustrates a cross-sectional view of one embodiment of a lifting arrangement for a tower section configured with the system for transporting and/or storing tower sections of wind turbines of the present disclosure, particularly illustrating a lifting arrangement having a spreader bar;

FIG. 7C illustrates a cross-sectional view of one embodiment of a lifting arrangement for two tower sections stacked atop one another and configured with the system for transporting and/or storing tower sections of wind turbines of the present disclosure;

FIG. 7D illustrates a cross-sectional view of one embodiment of a lifting arrangement for two tower sections stacked atop one another and configured with the system for transporting and/or storing tower sections of wind turbines of the present disclosure, particularly illustrating a lifting arrangement having a spreader bar;

DETAILED DESCRIPTION OF THE INVENTION

Figure 1:
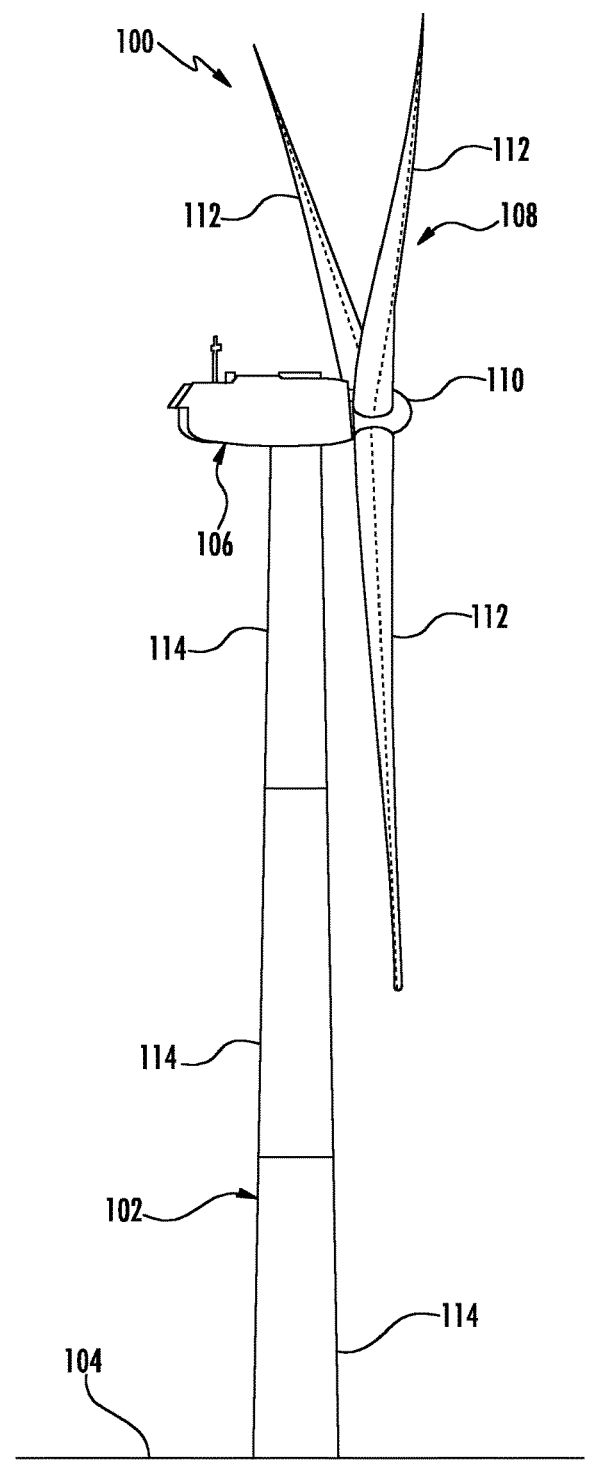
FIG. 1 illustrates a perspective view of one embodiment of a wind turbine according to the present disclosure, particularly illustrating a wind turbine tower having a plurality of tower sections.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the drawings, FIG. 1 illustrates a wind turbine 100 having a tower 102 standing upright on a suitable foundation 104 (e.g., a concrete slab, ground surface or other suitable foundation). A nacelle 106 is mounted atop the tower 102 and includes a rotor 108 coupled thereto. The rotor 108 has a rotatable hub 110 and a plurality of rotor blades 112 coupled to hub 110. More specifically, as shown, the hub 110 includes three rotor blades 112. Alternatively, the rotor 108 may have more or less than three rotor blades 112. Further, the rotor blades 112 are positioned about the hub 110 to facilitate rotating rotor 108 to transfer kinetic energy from the wind into usable mechanical energy, and subsequently, electrical energy.

The tower 102 is suitably tubular, and in the illustrated embodiment it is annular—having an internal cavity (not shown) extending longitudinally within tower 102 from the foundation 104 up to nacelle 106. The tower 102 generally includes a plurality of individual tower sections 114 that are connectable to each other in a stacked, end-to-end (e.g., one on top of the other) relationship to form the tower 102. Further, the tower sections 114 may each be of generally constant transverse cross-sectional dimension (e.g., a constant diameter in the illustrated embodiment in which tower sections 114 are each generally annular), or one or more of tower sections 114 may be frusto-conical, and/or the transverse cross-sectional dimension of one or more of tower sections 114 may be constant but different from that of one or more of the other tower sections—such as in a stepped configuration in which the transverse cross-sectional dimension of each tower section 114 decreases as the sections are stacked toward to the top of tower 102.

Figure 2:
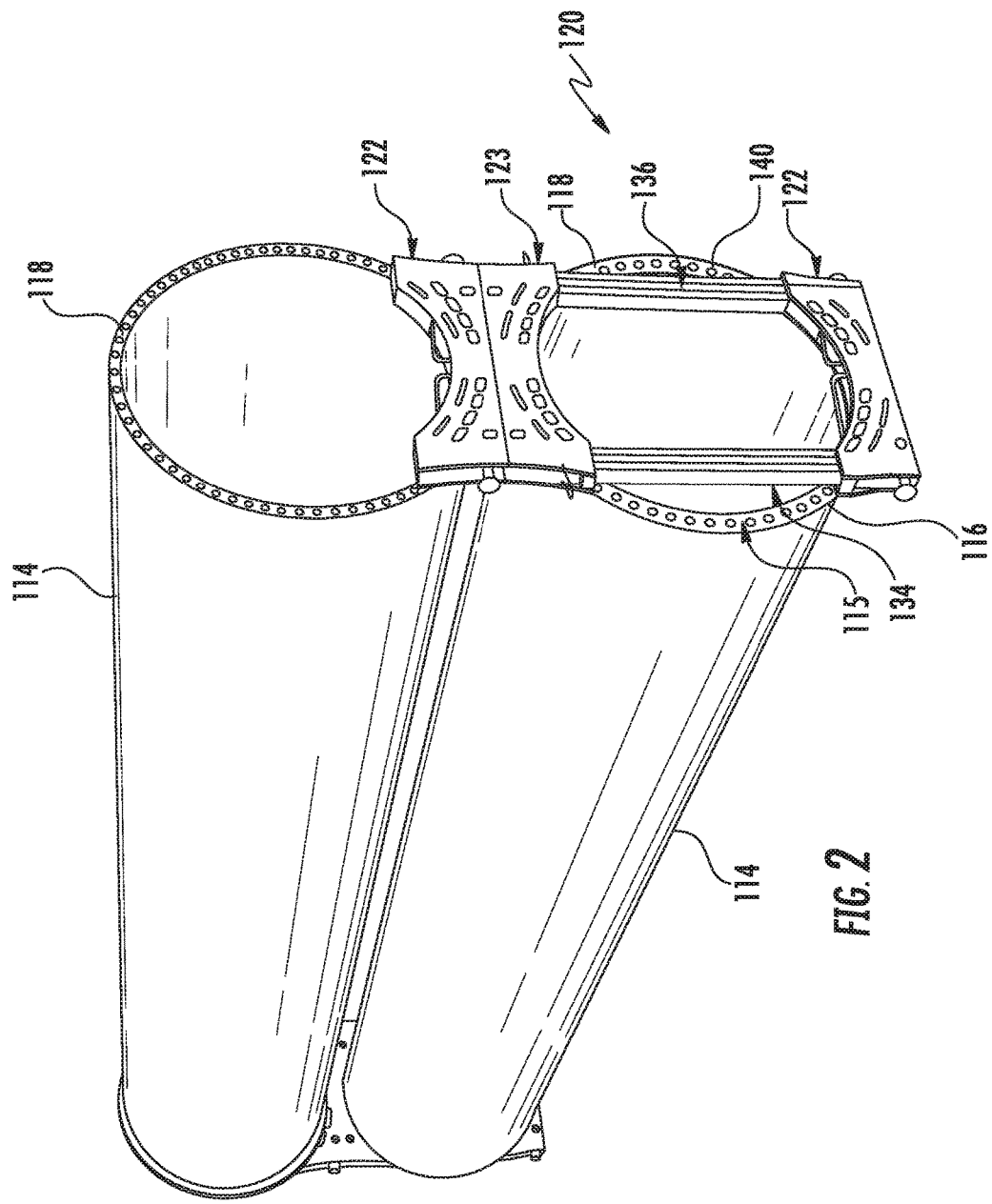
FIG. 2 illustrates a perspective view of one embodiment of a plurality of tower sections of the wind turbine tower stacked atop one another using a system for transporting and/or storing tower sections of wind turbines according to the present disclosure.

With reference to FIG. 2, the tower sections 114 of wind turbine 100 of the embodiment illustrated in FIG. 1 are illustrated as being stacked onto a foundation, such as onto a weather deck of a cargo shipping vessel or a floor of a warehouse for storage, via a system 120 according to the present disclosure. It is understood that system 120 may be used for the shipping of tower sections 114 other than those of wind turbine 100 of the FIG. 1 embodiment without departing from the scope of this invention. As shown, the system 120 includes at least one pair of cradle elements 122, 123 having a first cradle element 122 configured to support a lower portion 116 of the tower section 114 and a second cradle element 123 configured to support an upper portion 118 of the tower section 114. Further, as shown, the first and second cradle elements 122, 123 are securable to a flange 115 of one of the tower sections 114. The system 120 also includes a pair of support members 134, 136 coupled to each of the first and second cradle elements 122, 123. Further, the cradle elements 122, 123 and/or the support members 134, 136 as described herein may be suitably constructed, such as of steel or other suitable material, to support the weight of tower section(s) 114 during transportation and/or storage.

Moreover, it should be understood that the system 120 of the present disclosure may include a plurality of pairs of cradle elements 122, 123 and a plurality of pairs of support members 134, 136 configured to be arranged with a plurality of tower sections 114 having varying diameters. As such, a plurality of tower sections 114 can be arranged and/or stacked together and easily transported and/or stored.

Figure 3:
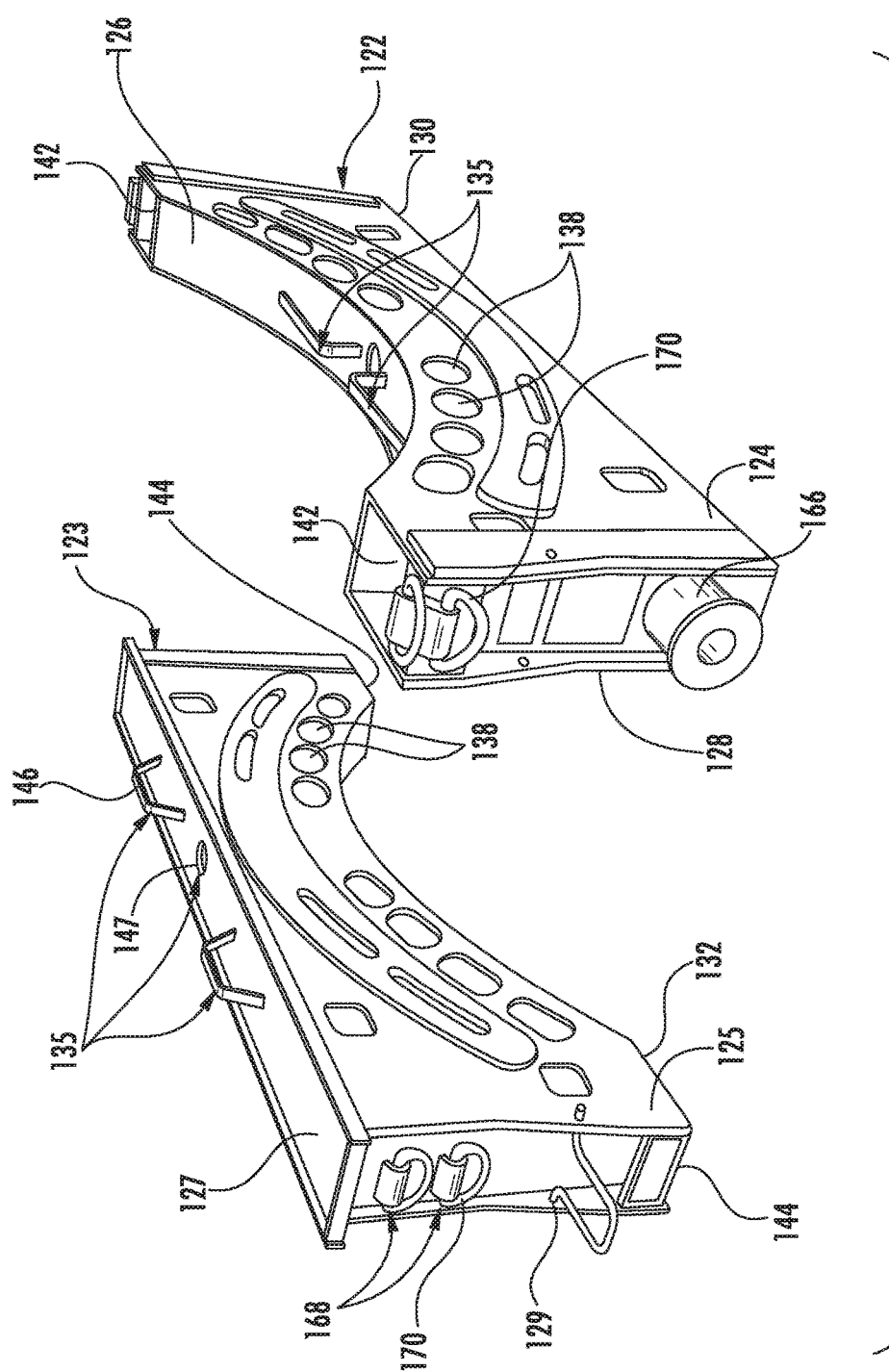
FIG. 3 illustrates a perspective view of one embodiment of first and second cradle elements of a system for transporting and/or storing tower sections of wind turbines according to the present disclosure.
Figure 4:
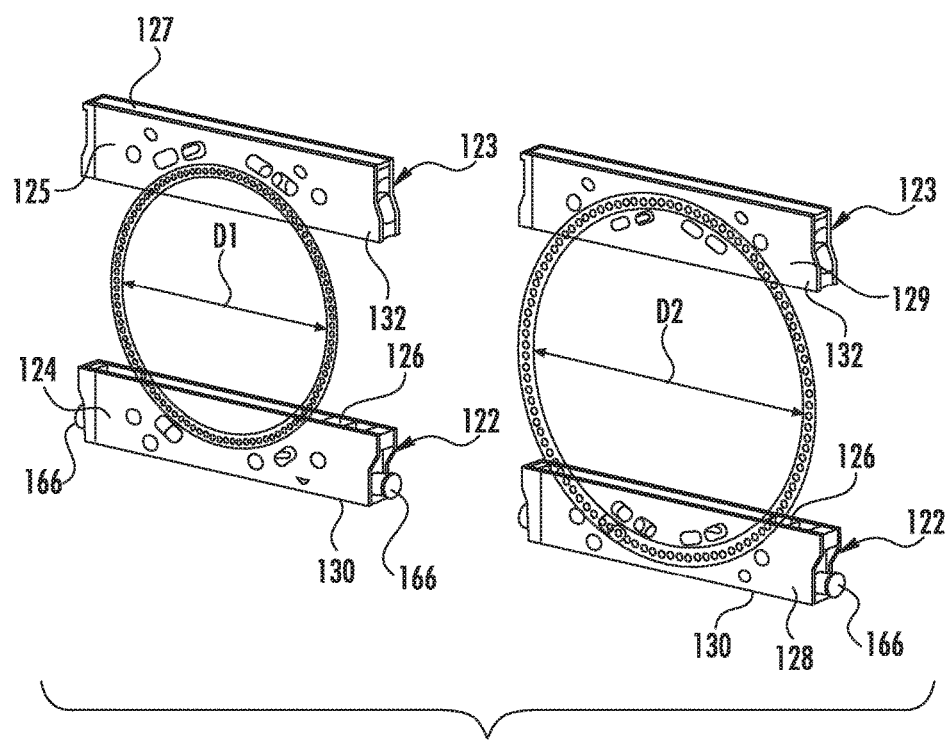
FIG. 4 illustrates a perspective view of one embodiment of two tower sections having varying diameters, particularly illustrating first and second cradle elements of the system for transporting and/or storing tower sections of wind turbines of the present disclosure configured with each tower section.

Referring now to FIGS. 3 and 4, the first and second cradle elements 122, 123 are also reversible in that first sides 124, 125 of the first and second cradle elements 122, 123 are configured to accommodate a tower section having a first diameter $D_1$ and opposite, second sides 128, 129 of the first and second cradle elements 122, 123 are configured to accommodate a tower section having a different, second diameter $D_2$. For example, as shown in FIG. 4, the second diameter $D_2$ is greater than the first diameter $D_1$. Thus, as shown, the first and second cradle elements 122, 123 can be reversed to accommodate tower diameters of varying sizes. Further, the first and second cradle elements 122, 123 may be adjustable to accommodate tower diameters of varying sizes. More specifically, in one embodiment, the first and second cradle elements 122, 123 may extend outward left and right or up and down, e.g. via a telescoping body, to accommodate tower diameters of varying sizes.

In addition, as shown in FIG. 3, opposing sides of the first and second cradle elements 122, 123 may each include one or more bolt slot openings 138. As such, the first and second cradle elements 122, 123 can be easily secured to the tower flange 115 of one of the tower sections 114 via one or more flange bolts 140 (FIG. 2) being secured through the one or more bolt slot openings 138.

Referring still to FIGS. 3 and 4, the first and second cradle elements 122, 123 each include lower surfaces 130, 132 and upper surfaces 126, 127. The lower surfaces 130 of the first cradle elements 122 provide a stable foundation for the tower sections 114 to inhibit the sections 114 against rolling or other movement relative to a foundation. More specifically, as shown, the lower surface 130 of the first cradle element 122 and the upper surface 127 of the second cradle element 123 provide a continuous, generally straight or flat surface. As such, for particular embodiments, the upper surface 127 of the second cradle element 123 may be a flat continuous upper surface configured for receiving a first cradle element of an adjacent tower section stacked thereon (FIG. 2). Further, as shown in FIG. 3, the upper surface 126 of the first cradle element 122 and/or the lower surface 132 of the second cradle element 123 may have a generally curved surface. Such curved surfaces are configured to minimize the material required to construct the first and second cradle elements 122, 123. Alternatively, as shown in FIG. 4, the upper surface 126 of the first cradle element 122 and/or the lower surface 132 of the second cradle element 123 may have a continuous, generally straight or flat surface.

Further, as shown in FIG. 3, the upper surfaces 126, 127 of the first and second cradle elements 122, 123 may include one or more lifting components 135. For example, the lifting components 135 may include one or more fork lift pockets 146 and/or one or more lift points 147. As such, the lifting components 135 can be utilized to separately lift the first and second cradle elements 122, 123 via a crane, a forklift, and/or any other suitable lifting means. Further, the first cradle element 122 and/or the second cradle element 123 may include one or more trunnions 166 configured on opposing sides thereof. More specifically, as shown in FIGS. 3 and 4, corresponding trunnions 166 are configured on opposing sides of the first cradle element 122. As such, the trunnion(s) 166 are configured as the primary lifting components when stacking and/or arranging the tower sections 114.

In still further embodiments, as shown in FIG. 3, the first and second cradle elements 122, 123 may also include one or more attachment locations 168 configured to receive at least one of a chain or strap for securing the first and second cradle elements 122, 123 to a foundation or foundation which is described in more detail below. For example, as shown, the attachment locations 168 include a plurality of D-rings 170. It should be further understood that any other suitable attachment location having any suitable hardware is within the spirit and scope of the present disclosure.

Still referring to FIG. 3, the upper surface 126 of the first cradle element 122 and the lower surface 132 of the second cradle element 123 may each include a pair of recesses 142, 144 configured to receive the support members 134, 136. As such, when the system 120 is assembled, the support members 134, 136 are configured to fit within the recesses 142, 144 and extend across the diameter of the tower section 114. In addition, as shown in FIGS. 5 and 6, each of the support members 134, 136 may be configured as a beam having a generally I-shaped (or H-shaped) cross-section 148. More specifically, as shown, the support members 134, 136 may have parallel flanges 150, 152 separated by a web 154. In addition, as shown in FIG. 5, each of support members 134, 136 may also include opposing end caps 160 having one or more bolt hole locations 162. The support members 134, 136 of the illustrated embodiment have a generally fixed length. As such, the system 120 may include a plurality of pairs of support members 134, 136 with varying lengths to accommodate tower sections 114 of varying diameters. Alternatively, the support members 134, 136 may be adjustable to accommodate tower diameters of varying sizes. More specifically, in one embodiment, the support members 134, 136 may be extendable, e.g. via a telescoping body, to accommodate tower diameters of varying sizes.

Further, as shown, each of support members 134, 136 may include one or more rod members 156 welded or otherwise secured between the parallel flanges 150, 152 adjacent to the web 154 on one or more sides thereof. Such rod members 156 can be arranged on outer side of the support members 134, 136 (see FIGS. 11-13) such that personnel can use the rod members 156 when climbing onto the stacked tower sections 114, for example, to apply lashing which is discussed in more detail below.

Figure 11:
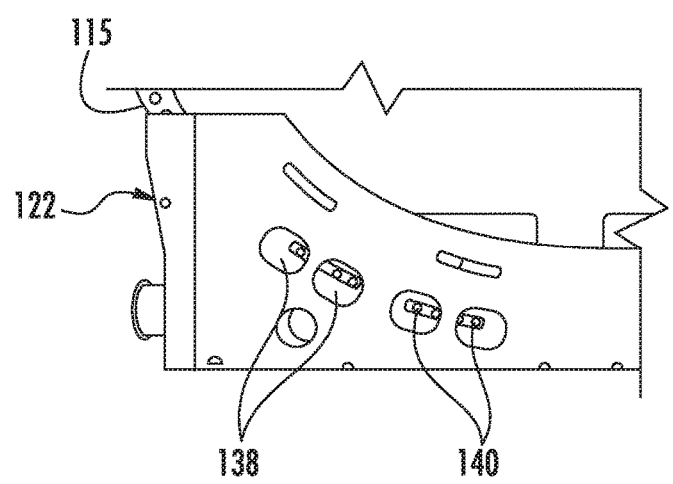
FIG. 11 illustrates a detailed view of the first cradle element of the system of FIG. 10 aligned with a tower flange of a tower section, particularly illustrating the bolt slot openings of the first cradle system aligned with the bolt holes of the tower flange.

In additional embodiments, as shown in FIG. 11, the system 120 may also include at least one shim plates 158 configured to fit within each of the recesses 142, 144. More specifically, as shown, the shim plates 158 can be inserted in the first cradle elements 122 to ensure that both of the support members 134, 136 are in level contact with the second cradle elements 123 as the load of the stacked section is carried by the first and second cradle elements 122, 123 and the support members 134, 136. Further, the bolt hole locations 162 within the end caps 160 of the support members 134, 136 are configured to receive one or more shim bolts 164 that secure the shim plates 158 thereto.

Referring now to FIG. 7, various stacking and/or lifting arrangements of the tower sections 114 utilizing the system 120 are illustrated. More specifically, as shown in FIG. 7A, the system 120 may include a single cradle element (i.e. first cradle element 122) that supports the lower portion 116 of the tower section 114. In such an embodiment, the first cradle elements 122 are sufficient to support a non-stacked tower section 114 during shipping and/or transportation. Further, as shown, a cable 174 can be configured between the first cradle element 122 and the tower section 114 when the tower section 114 needs to be lifted (e.g. via a crane) so as to arrange the non-stacked tower section 114 with other tower sections 114. Referring now to FIG. 7B, the system 120 may include the first cradle element 122 and the second cradle element 123 that supports the lower and upper portions 116, 118 of the tower section 114, respectively. Further, as shown, a cable 174 can be configured between the first cradle element 122 and the tower section 114 when the tower section 114 needs to be lifted (e.g. via a crane) so as to arrange the tower section 114 with other tower sections 114. Referring now to FIG. 7C, the system 120 may further include an additional first cradle element 122 stacked atop the original first and second cradle elements 122, 123, e.g. of FIG. 7B. Thus, as shown, the additional first cradle element 122 can be easily stacked atop the second cradle element 123. Further, as shown, a cable 174 can be configured between the additional first cradle element 122 and the tower section 114 when the tower section 114 needs to be lifted (e.g. via a crane) so as to arrange the tower section 114 with other tower sections 114. In addition, as shown in FIGS. 7B and 7D, the lifting arrangement may include a spreader bar 16 configured with the cable 174 so as to more evenly distribute the load of the tower sections 114.

Figure 8:
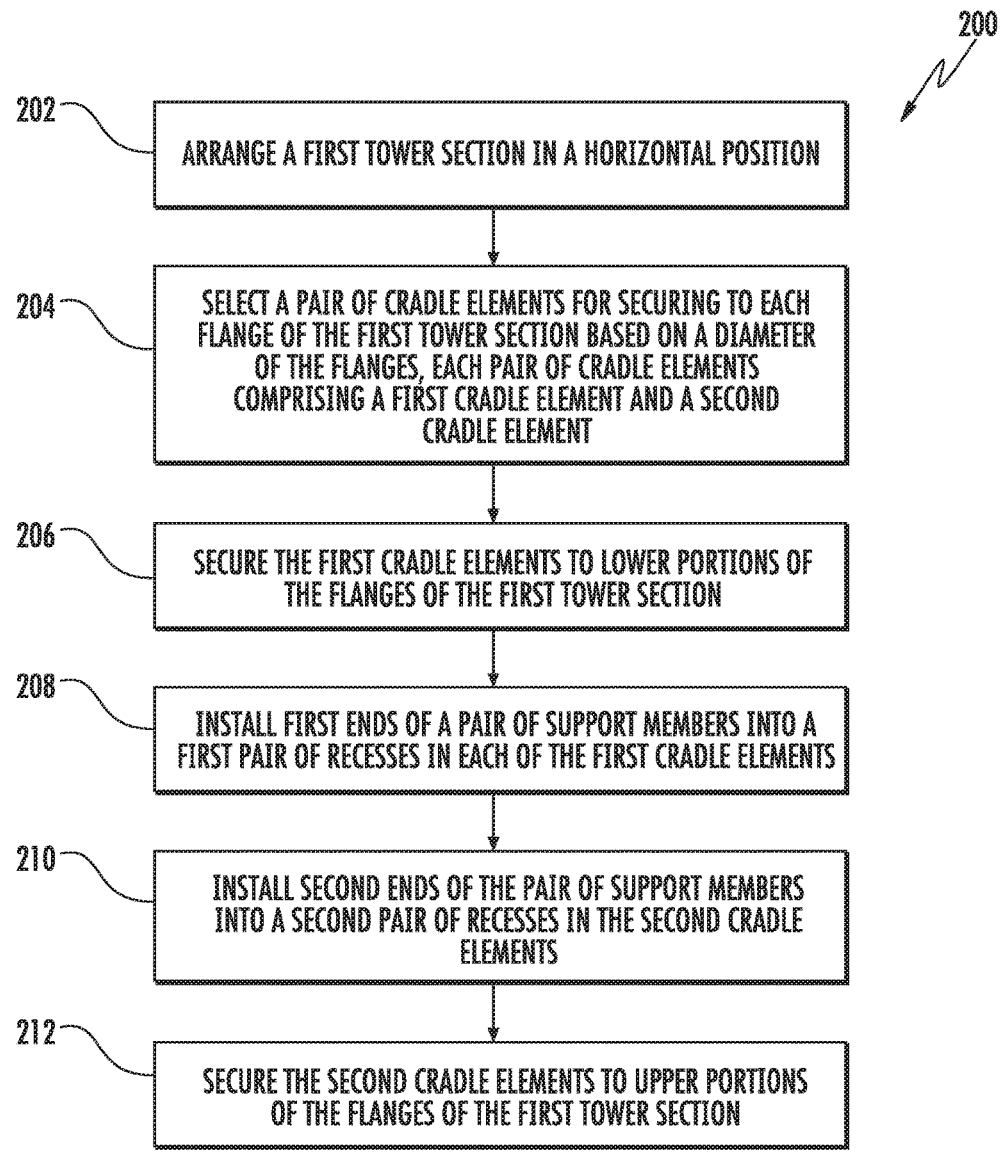
FIG. 8 illustrates a flow diagram of one embodiment of a method for transporting and/or storing tower sections of a tower of a wind turbine according to the present disclosure.
Figure 9:
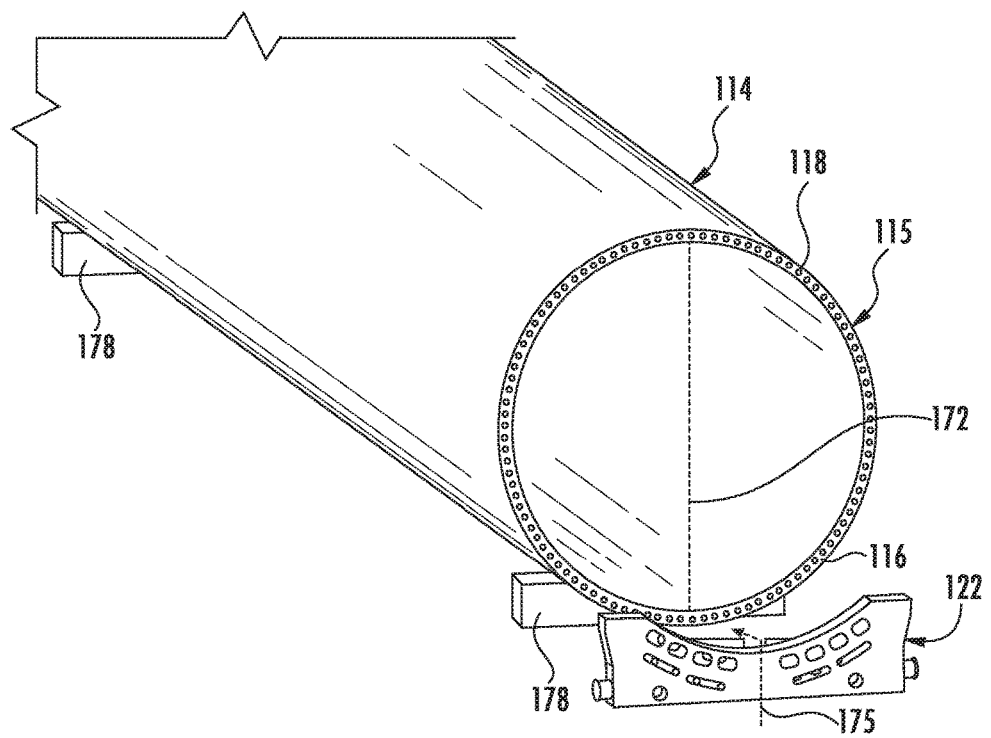
FIG. 9 illustrates a perspective view of one embodiment of a first cradle element of the system for transporting and/or storing tower sections of wind turbines of the present disclosure being aligned with a tower flange of a tower section.
Figure 10:
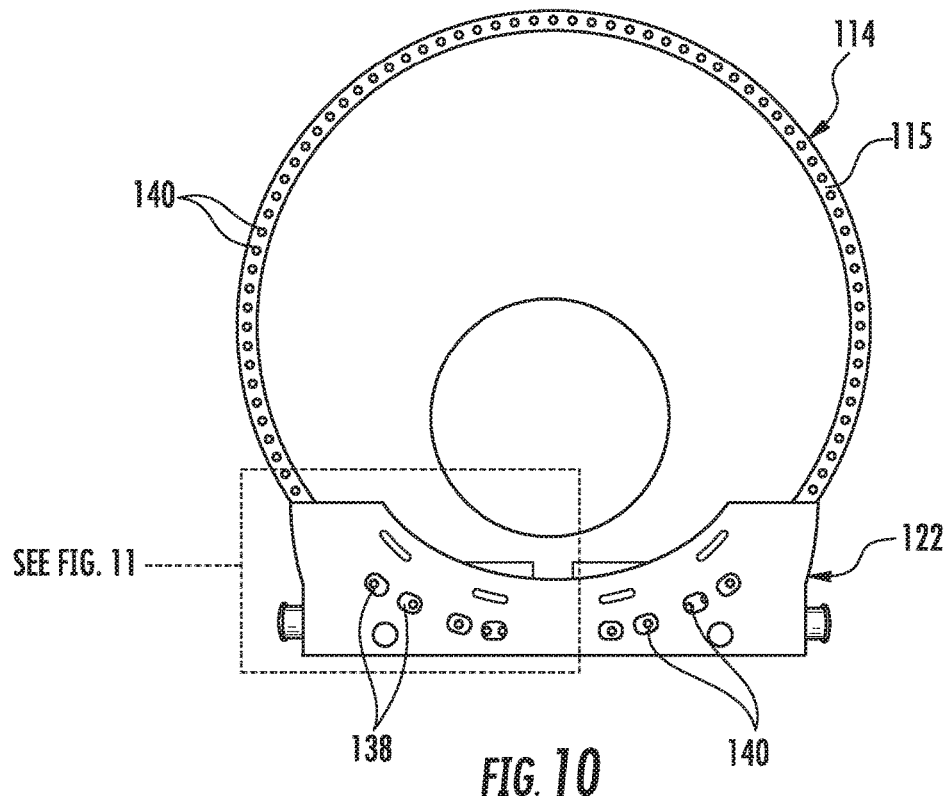
FIG. 10 illustrates a front view of the first cradle element of the system of FIG. 9 aligned with a tower flange of a tower section.

Referring now to FIG. 8, a flow diagram of one embodiment of a method 200 of transporting or storing tower sections 114 of a tower 102 of a wind turbine 100 is illustrated. As shown at 202, the method 200 includes arranging a first tower section 114 in a horizontal position. For example, as shown in FIG. 9, one of the tower sections 114 is arranged in a horizontal position atop one or more tower supports 178. In addition, as shown in FIG. 9, the method 200 may also include identifying a center line 172 of the flanges 115 of the first tower section 114 and locating a center 175 of the first and second cradle elements 122, 123 at the centerline 172 of each flange 115.

As shown at 204, the method 200 also includes selecting a pair of cradle elements 122, 123 for securing to each flange 115 of the first tower section 114 based on the diameters of the flanges 115. Further, each pair of cradle elements 122, 123 includes a first cradle element 123 and a second cradle element 123. In addition, it is important to note that opposing flanges 115 of one of the tower section 114 may or may not be the same. As such, different cradle elements accommodating different-sized tower diameters may be selected to accommodate the varying sizes. Further, in one embodiment, the method 200 may include selecting which side of the first and second cradle elements 122, 123 to secure to the lower and upper portions 116, 118 of the flanges 115 of the first tower section 114, respectively. In other words, as mentioned, wherein a first side 124, 125 of the first and second cradle elements 122, 123 is configured to accommodate a tower section having a first diameter $D_1$ and an opposite, second side 128, 129 of the first and second cradle elements 122, 123 is configured to accommodate a tower section having a different, second diameter $D_2$.

Figure 16:
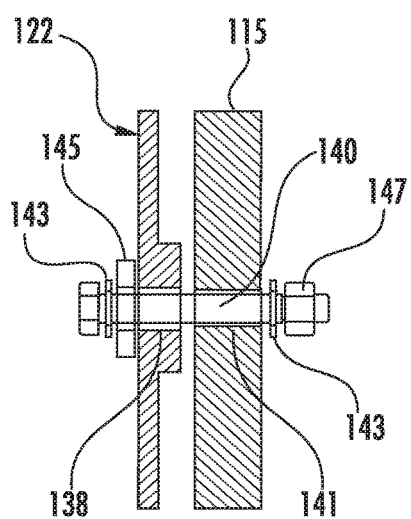
FIG. 16 illustrates a cross-sectional view of one embodiment of a first cradle element of the system of the present disclosure bolted to the tower flange of the tower section.

Referring still to FIG. 8, as shown at 206, the method 200 includes securing the first cradle elements 122 to lower portions 116 of the flanges of the first tower section 114. For example, as shown in FIG. 9, while the tower section 114 is in the horizontal position and support by the tower supports 178, the first cradle element(s) 122 can be easily secured to the lower portion(s) 116 of the tower flange(s) 115 as indicated by the arrow. More specifically, as shown in FIGS. 10-12 and 16, the bolt slot openings 138 of the first cradle element 122 may be substantially aligned with one or more bolt holes 141 of the tower flange 115. Further, the bolt slop openings 138 may be sized and/or shaped to accommodate a plurality of different bolt patterns of the tower flange 115. Thus, as shown, the flange bolts 140 can then be used to secure the first cradle element 122 to the tower flange 115 through the bolt slot openings 138. For example, as particularly shown in FIG. 12, the bolts may be torqued to about 50% in the illustrated numbered pattern to ensure balancing during installation. In addition, as shown in FIG. 16, the flange bolts 140 may be secured through the cradle elements 122, 123 and the tower flange 115 via one or more standard washers 143, an oversized washer 145, and/or one or more nuts 147 configured with a threaded surface of the flange bolts 140 or combinations thereof.

Figure 13:
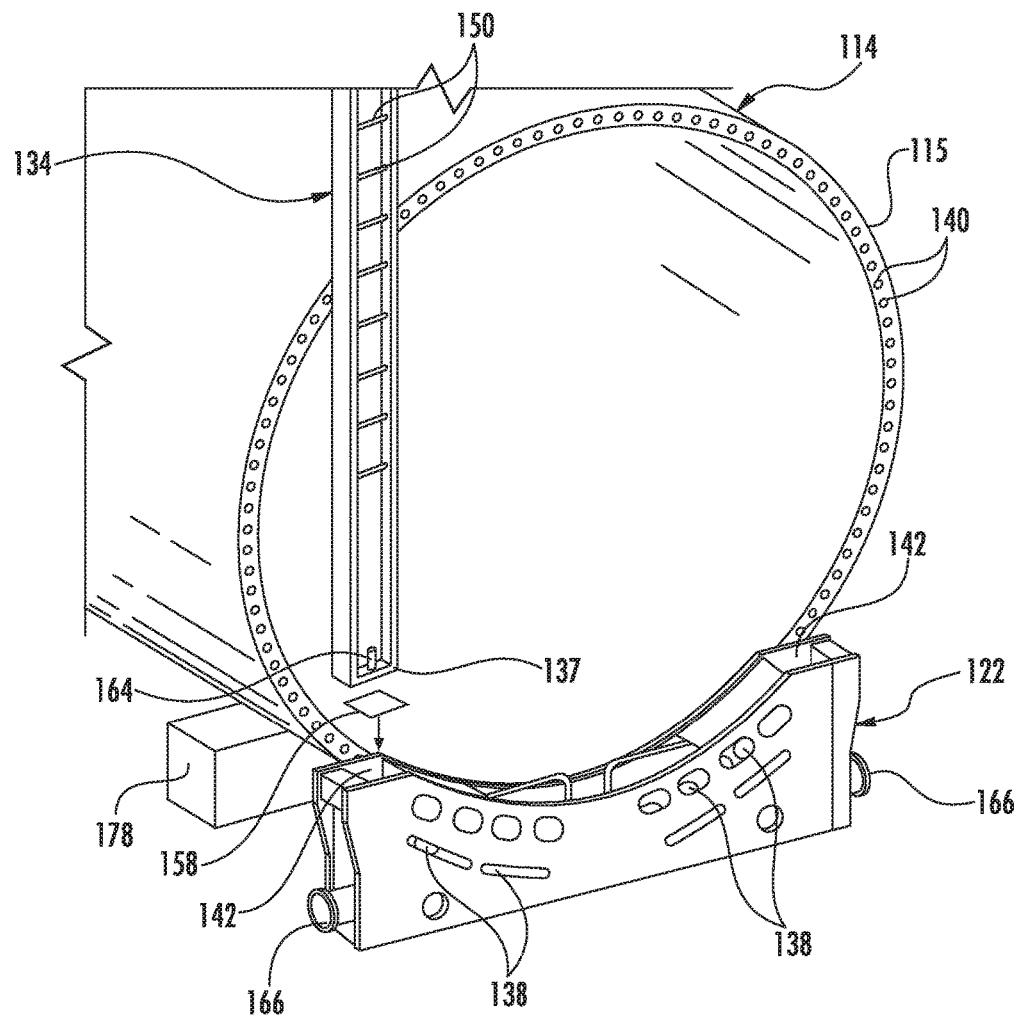
FIG. 13 illustrates a partial, perspective view of one embodiment of the system of FIG. 10 and further illustrating one of the support members being inserted into a recess of the first cradle element.
Figure 14:
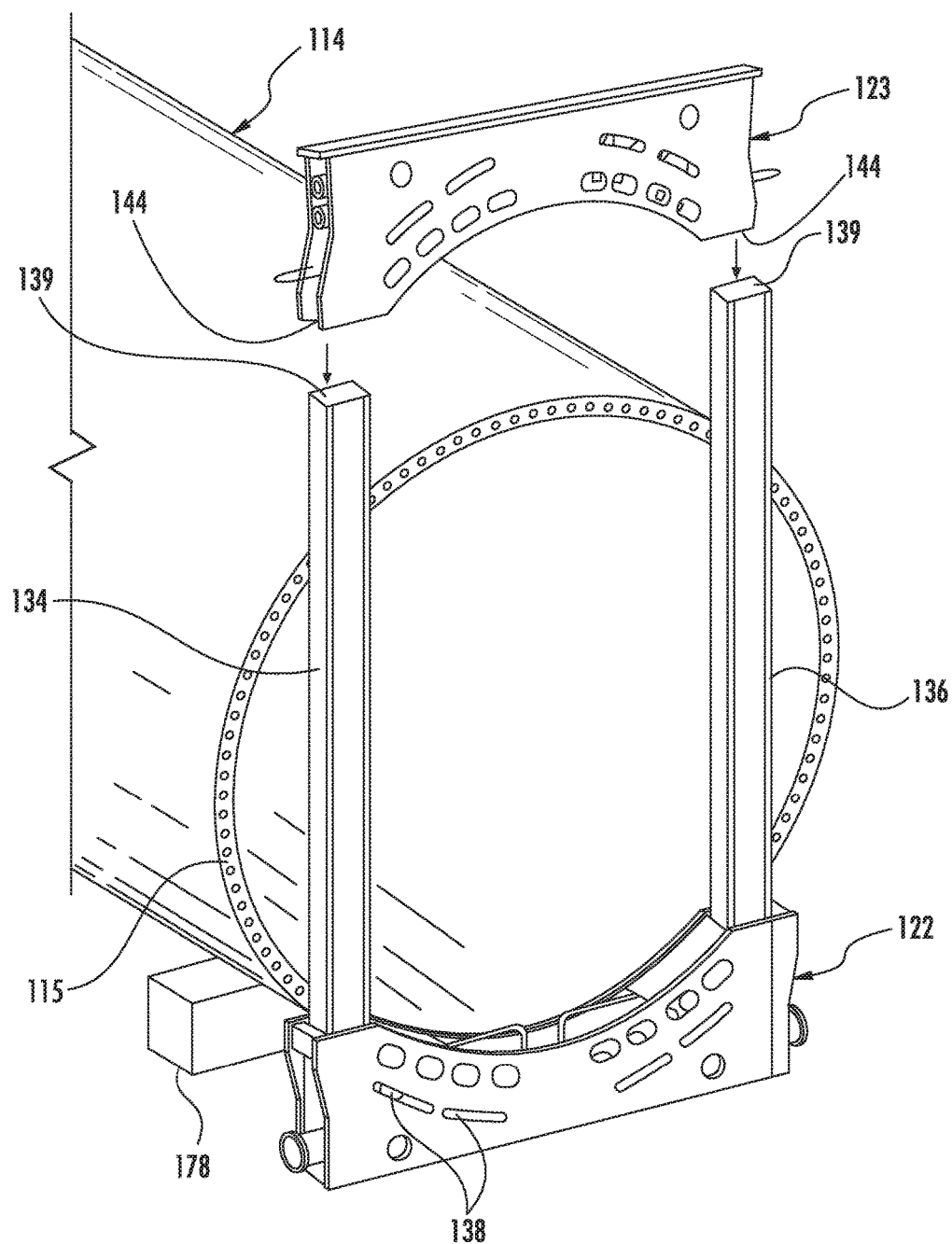
FIG. 14 illustrates a partial, perspective view of one embodiment of the system of FIG. 10 and further illustrating the second cradle element being aligned with the support members.

Referring still to FIG. 8, as shown at 208, the method 200 includes installing first ends 137 of a pair of support members 134, 136 into a first pair of recesses 142 in each of the first cradle elements 122. For example, as shown in FIG. 13, a first end 137 of a first support element 134 is being inserted into a first recess 142 of the first cradle element 122. In additional embodiments, as shown, the method 200 may include inserting at least one of a support pad or a shim plate 158 into at least one of the first or second pairs of recesses 142, 144 of the first and second cradle elements 122, 123 before inserting the pair of support members 134, 136. Further, as shown at 210 of FIG. 8, the method 200 also includes installing second ends 139 of the pair of support members 134, 136 into a second pair of recesses 144 in the second cradle elements 123. More specifically, as shown in FIG. 14, the second ends 139 of the support members 134, 136 are being inserted into corresponding recesses 144 of the second cradle element 123 as indicated by the arrows.

Figure 12:
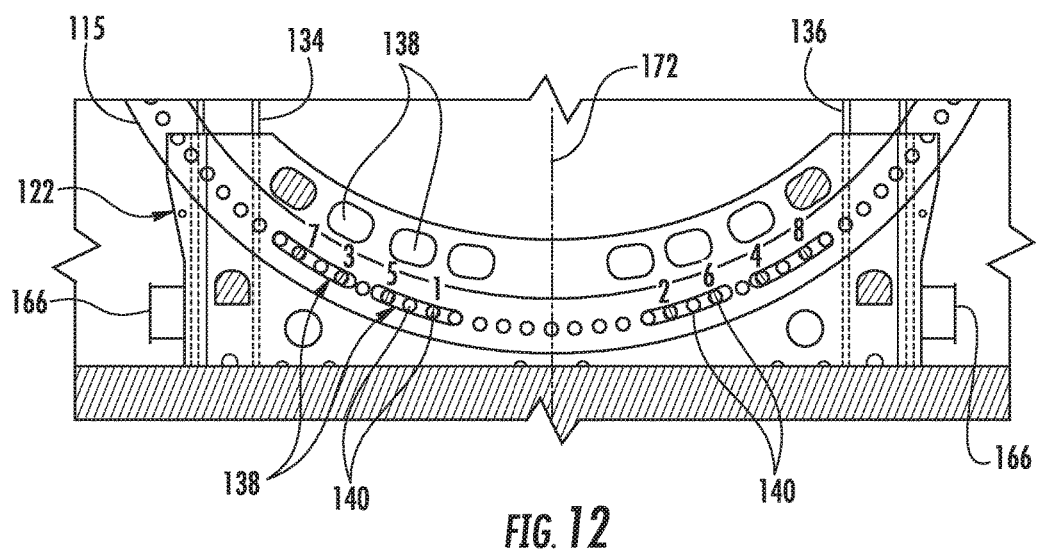
FIG. 12 illustrates a detailed front view of the first cradle element of the system of FIG. 10 aligned with a tower flange of a tower section, particularly illustrating the bolt slot openings of the first cradle system aligned with the bolt holes of the tower flange and further illustrating a preferred order for torquing the bolts.
Figure 15:
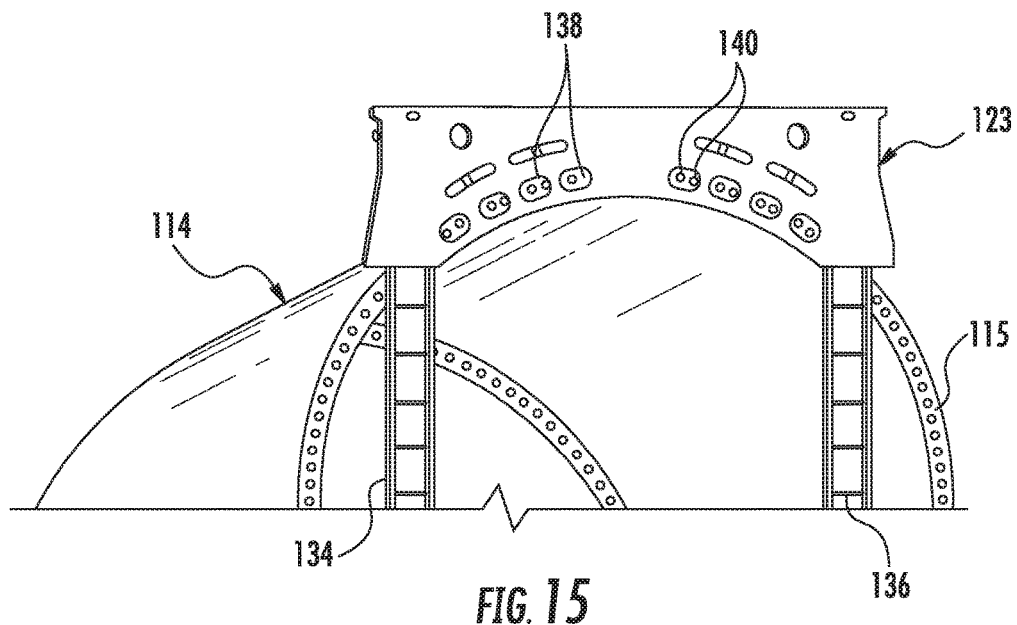
FIG. 15 illustrates a partial, perspective view of the system of FIG. 14, particularly illustrating the second cradle element being aligned with an upper portion of the tower flange of the tower section.

Further, as shown at 212 of FIG. 8, the method 200 also includes securing the second cradle elements 123 to upper portions 118 of the flanges 115 of the first tower section 114. More specifically, as shown in FIG. 15, the second cradle element(s) 123 can be easily secured to the upper portion(s) 118 of the tower flange(s) 115 via the bolt slot openings 138 of the second cradle element 123 which are substantially aligned with one or more flange bolts 140 on the tower flange 115. The flange bolts 140 can then be used to secure the second cradle element 123 to the tower flange 115 through the bolt slot openings 138. It should be understood that the flange bolts 140 may be torqued in a similar manner as illustrated in FIG. 12.

As shown in FIGS. 7C, 7D, and 17-18, the method 200 may further include securing an additional first cradle elements 122 to lower portions 116 of tower flanges 115 of a second tower section 117 and stacking the second tower section 117 atop the first tower section 114. Further, as shown, the tower sections 114, 117 may be arranged such that a larger flange of one tower section is arranged or stacked atop a smaller flange of another tower section such that the overall height $H_1$ of the stacked tower sections 114, 117 at one end is approximately equal to the overall height $H_2$ at an opposing end.

Figure 17:
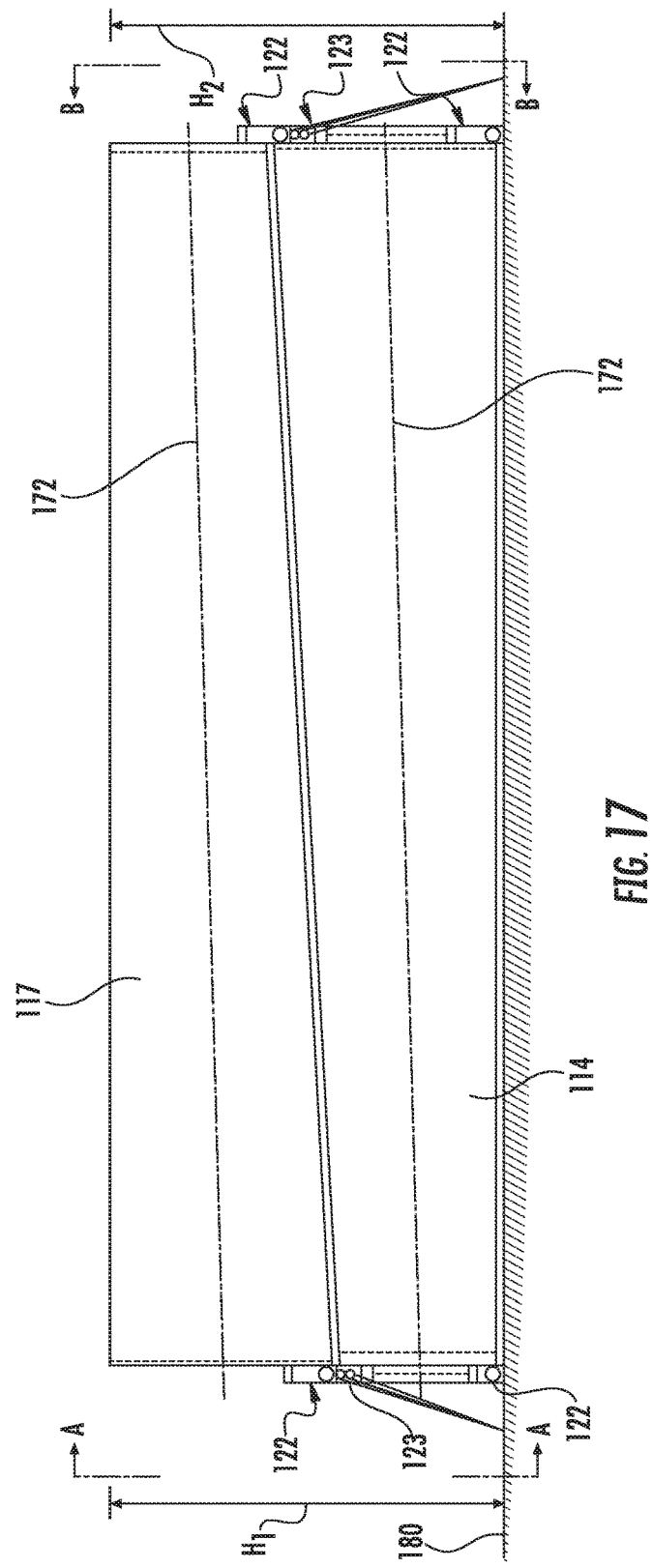
FIG. 17 illustrates a side elevation view of another embodiment of a plurality of tower sections of the wind turbine tower stacked atop one another using a system according to the present disclosure.
Figure 18:
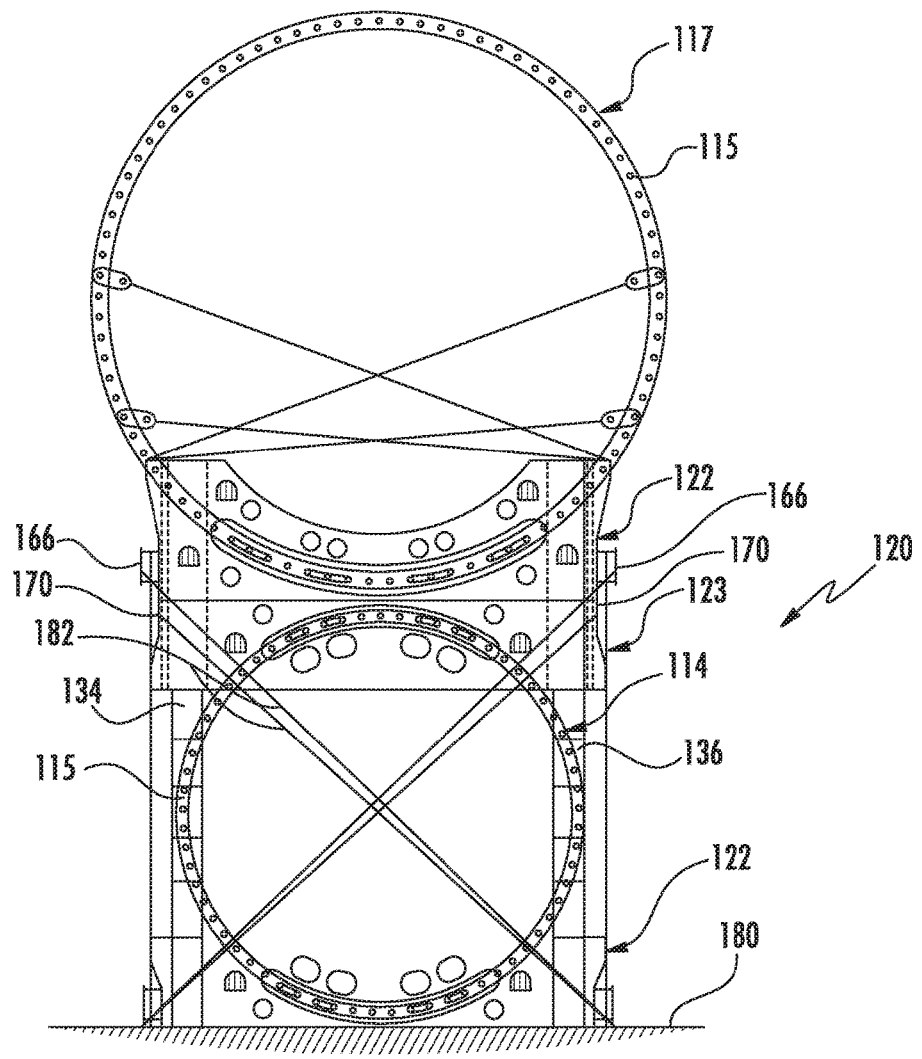
FIG. 18 illustrates a front section view of the stacked tower sections of FIG. 17, particularly illustrating the tower sections secured to a foundation via one or more cables.

Referring still to FIGS. 17-18, the method 200 may also include securing at least one of the first or second cradle elements 122, 123 to a foundation 180, e.g. during transportation, so as to prevent movement of the tower sections 114, 117. For example, as shown, the system 120 may include one or more cables 180 configured with one or more of the first or second cradle elements 122, 123. More specifically, as shown in FIG. 18, a plurality of cables 182 are secured between the trunnions 166 of the top first cradle element 122, the D-rings of the second cradle element 123, and the foundation 180.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for transporting or storing one or more tower sections of a tower of a wind turbine, the system comprising:
   at least one pair of cradle elements comprising:
   a first cradle element configured to support a lower portion of the one or more tower sections; and, a second cradle element configured to support an upper portion of the one or more tower sections, each of the first and second cradle elements securable to a flange of one of the one or more tower sections and being reversible in that a first side of each of the first and second cradle elements is configured to accommodate a tower section having a first diameter and an opposite, second side of each of the first and second cradle elements is configured to accommodate a tower section having a different, second diameter; and,
a pair of support members coupled to each of the first and second cradle elements.

2. The system of claim 1, wherein the first and second cradle elements each comprise one or more bolt slot openings, the first and second cradle elements securable to the flange of one of the one or more tower sections via one or more flange bolts being secured through the one or more bolt slot openings.

3. The system of claim 1, wherein the first and second cradle elements each comprise an upper surface, the upper surfaces comprising one or more fork lift pockets.

4. The system of claim 3, wherein the upper surface of the first cradle element and a lower surface of the second cradle element each comprise a pair of recesses configured to receive the pair of support members.

5. The system of claim 3, wherein the upper surface of the second cradle element is a flat continuous upper surface configured for receiving a first cradle element of an adjacent tower section stacked thereon.

6. The system of claim 4, wherein each of the support members comprises an H-shaped cross-section comprising parallel flanges separated by a web.

7. The system of claim 6, wherein each of support members comprises one or more rod members welded between the parallel flanges adjacent to the web on one or more sides thereof.

8. The system of claim 6, further comprising at least one shim plate configured to fit within each of the recesses.

9. The system of claim 8, wherein each of support members comprises opposing end caps comprising one or more bolt hole locations configured to receive shim bolts that secure the at least one shim plate thereto.

10. The system of claim 1, wherein at least one of the first cradle element or the second cradle element comprises one or more trunnions configured on opposing sides thereof.

11. The system of claim 1, wherein the first and second cradle elements comprise one or more attachment locations configured to receive at least one of a chain or strap for securing the first and second cradle elements to a foundation, wherein the one or more attachment locations comprise one or more D-rings.

12. The system of claim 1, further comprising a plurality of pairs of cradle elements and a plurality of pairs of support members including the pair of support members configured to fit a plurality of tower sections having varying diameters.

* * * * *